(12) United States Patent
Fujii et al.

(10) Patent No.: US 10,011,516 B2
(45) Date of Patent: Jul. 3, 2018

(54) OPTICAL FIBER BASE MATERIAL MACHINING METHOD

(71) Applicant: Shin-Etsu Chemical Co., Ltd., Tokyo (JP)

(72) Inventors: Hideki Fujii, Ibaraki (JP); Takashi Koshigai, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 15/063,437

(22) Filed: Mar. 7, 2016

(65) Prior Publication Data

US 2016/0264450 A1     Sep. 15, 2016

(30) Foreign Application Priority Data

Mar. 10, 2015   (JP) .................. 2015-046571

(51) Int. Cl.
| | |
|---|---|
| *C03B 37/012* | (2006.01) |
| *C03C 25/00* | (2018.01) |
| *C03C 25/002* | (2018.01) |
| *C03B 37/027* | (2006.01) |

(52) U.S. Cl.
CPC .. *C03B 37/01251* (2013.01); *C03B 37/02772* (2013.01); *C03C 25/002* (2013.01); *C03B 2205/47* (2013.01); *Y02P 40/57* (2015.11)

(58) Field of Classification Search
CPC . C03C 25/00; C03B 2203/02; C03B 2205/47; C03B 37/025; C03B 37/01466; C03B 37/0124; C03B 37/01251

USPC .......................................................... 65/435
See application file for complete search history.

(56) References Cited

U.S. PATENT DOCUMENTS

| | | | |
|---|---|---|---|
| 6,779,362 B2* | 8/2004 | Shimizu ............... | C03B 23/047 65/381 |
| 2004/0172976 A1* | 9/2004 | Shimizu ............... | C03B 23/043 65/272 |
| 2015/0007616 A1 | 1/2015 | Fujii | |

FOREIGN PATENT DOCUMENTS

CN         102992612 A       3/2013

OTHER PUBLICATIONS

Office Action issued for counterpart Chinese Application 201610130394.1, issued by the Chinese Intellectual Property Office dated Jan. 12, 2018.

\* cited by examiner

*Primary Examiner* — Alison L Hindenlang
*Assistant Examiner* — Mohamed K Ahmed Ali (57) ABSTRACT

An optical fiber base material machining method for forming spindle-shaped portions at ends of the optical fiber base material by severing the optical fiber base material after reducing an outer diameter of the optical fiber base material to a predetermined target outer diameter at a predetermined machining position, comprising: reducing the outer diameter to a predetermined intermediate outer diameter between the outer diameter before the machining and the target outer diameter at the machining position; flame polishing a surface of the optical fiber base material in a region including the machining position; and further reducing the outer diameter of the optical fiber base material.

8 Claims, 13 Drawing Sheets

OPTICAL FIBER BASE MATERIAL MACHINING METHOD

The contents of the following Japanese patent application are incorporated herein by reference:
NO. 2015-046571 filed on Mar. 10, 2015.

BACKGROUND

1. Technical Field

The present invention relates to a machining method of an optical fiber base material.

2. Related Art

An optical fiber base material undergoes a primary elongation with heating and elongation and diameter reduction, using an elongation apparatus that includes an electric furnace, and is machined to have a suitable diameter for a drawing machine. Also, spindle shapes suitable for drawing at both ends or one end of the optical fiber base material are formed by the drawing using a glass lathe. Further, the optical fiber base material is hung by the drawing machine via a dummy glass rod fused to one end of the optical fiber base material, and the optical fiber is drawn forth from a thin diameter portion having the spindle shape at the other end of the optical fiber base material.

An optical fiber base material drawing includes heating, by a burner flame, the optical fiber base material horizontally gripped by a chuck of a glass lathe, moving a tail stock of the glass lathe while adjusting the fire power, and drawing the base material. As a result, the softened part of the optical fiber base material becomes thinner gradually, and then the spindle shape is formed. Finally, the optical fiber base material is thermally cut by adjusting the flame smaller and heating locally, and the spindle-shaped parts are ends of the optical fiber base material.

Also, when drawing the optical fiber from the optical fiber base material, if there are scratches or impurities on the surface of the optical fiber base material, they will be the reasons such as a disconnection of the drawn optical fibers, changes of characteristics and the like.

Here, the surface of the optical fiber base material is finished in a smooth state without impurities by a flame polishing.

SUMMARY

As an outer diameter of the optical fiber base material becomes greater, the drawing to form the spindle shapes, a gas amount necessary for preheating, and the machining time increase. As a result, an adhesion amount of glass microparticles known as a silica cloud that adheres to a region on the surface of the optical fiber base material near the region heated by the flame increases, and this worsens the surface state of the optical fiber base material. Here, a machining method by which the adhesion amount of the silica cloud does not increase even when enlarging the diameter of the optical fiber base material has been desired.

In one aspect of the present invention, provided is an optical fiber base material machining method to sever the optical fiber base material after reducing a diameter of the optical fiber base material to a predetermined target outer diameter at a predetermined machining position, and to form spindle-shaped parts at ends of the optical fiber base material, the optical fiber base material machining method comprising: a stage of reducing the outer diameter of the optical fiber base material to a predetermined intermediate outer diameter between the outer diameter before the machining and the target outer diameter at the machining position, a stage of flame polishing the surface of the optical fiber base material with the diameter reduced to the intermediate outer diameter in a region including the machining position, and a stage of further reducing the diameter of the optical fiber base material.

The summary of the invention described above does not necessarily describe all features of the embodiments of the present invention. The present invention may also be a sub-combination of the features described above.

Hereinafter, some embodiments of the present invention will be described. The embodiments described below do not limit the invention according to the claims, and all the combinations of the features described in the embodiments are not necessarily essential to means provided by aspects of the invention.

DESCRIPTION OF EXEMPLARY EMBODIMENTS

Figure 1:
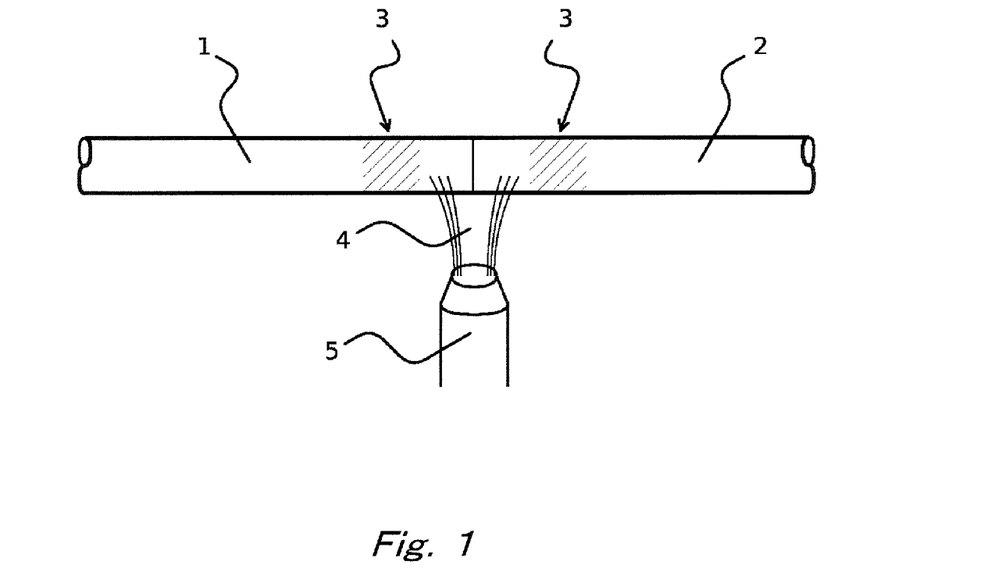
FIG. 1 is a schematic view of one procedure of a drawing according to one embodiment.

FIGS. 1 to 7 are schematic views of an optical fiber base material drawing method according to an embodiment of the present invention, shown in multiple stages. In FIGS. 2 to 7, components that are the same as shown in FIG. 1 are given the same reference numerals, and redundant descriptions are omitted.

As shown in FIG. 1, an optical fiber base material 1 is horizontally gripped by a glass lathe in a state being connected with a dummy rod 2 at one end. A machining position is set near an end of such optical fiber base material 1, and at the machining position, a burner flame 4 is blown from a burner 5 as a heating source toward one side face of the optical fiber base material 1. As a result, the preheated optical fiber base material 1 becomes softened at the machining position.

Figure 2:
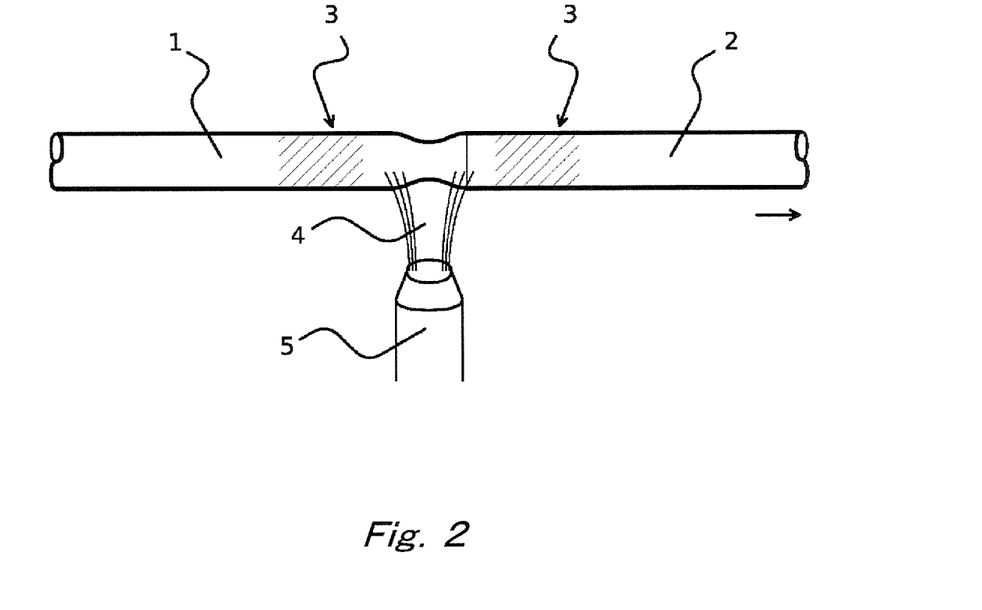
FIG. 2 is a schematic view of another procedure of the drawing according to one embodiment.

FIG. 2 is a schematic view of another stage in the drawing method of the optical fiber base material 1. As shown in the figures, the optical fiber base material 1 with a part softened by the preheating is elongated in the softened region by increasing the space of the chuck gripping the optical fiber base material 1 at the glass lathe, and the outer diameter is reduced.

In this stage, the reduced diameter of the optical fiber base material 1 is an intermediate outer diameter that is greater than the final target outer diameter of the diameter reduction. In this way, reducing the diameter of the optical fiber base material 1 to the intermediate outer diameter is referred to as a primary diameter reduction here.

The intermediate outer diameter as the target of the primary diameter reduction is preferably no less than ½ of the outer diameter of the optical fiber base material 1 before reducing the diameter, i.e. before the machining. If the minimum diameter of the optical fiber base material 1 after reducing the diameter is less than ½ of the outer diameter of the optical fiber base material 1 before reducing the diameter, the optical fiber base material 1 becomes too soft and hangs down from the glass lathe. In this case, when rotating with the glass lathe, there is a possibility that the optical fiber base material 1 whirls. However, if the softening of the optical fiber base material 1 is insufficient due to the insufficient preheating, it becomes difficult to reduce the diameter of the optical fiber base material 1.

After the stage of the primary diameter reduction described above, a silica cloud 3 that is generated during the processing of connecting the optical fiber base material 1 to the dummy rod 2 and adhered to the surface of the optical fiber base material 1 and a silica cloud 3 generated by the preheating of the primary diameter reduction are deposited together on the surface of the optical fiber base material 1. The decomposition reaction of the quartz glass at a high temperature is complicated, but can essentially be assumed as $SiO_2$ decomposing into SiO and $O_2$, as shown by Expression 1 below.

Expression 1:

Furthermore, the evaporated SiO causes a hydrolytic reaction in the atmosphere, as shown by Expression 2 below, to become $SiO_2$ again and be precipitated on a region with a low temperature near the heated portion as glass microparticles becoming a silica cloud 3, and adhering to the surface of the optical fiber base material 1.

Expression 2:

Also, on the surface of the optical fiber base material 1, impurities sometimes are generated by dragging of the burner flame 4. As a result, in the optical fiber base material 1, the region where the silica cloud 3 adheres is also the region where the impurities are often generated.

Figure 3:
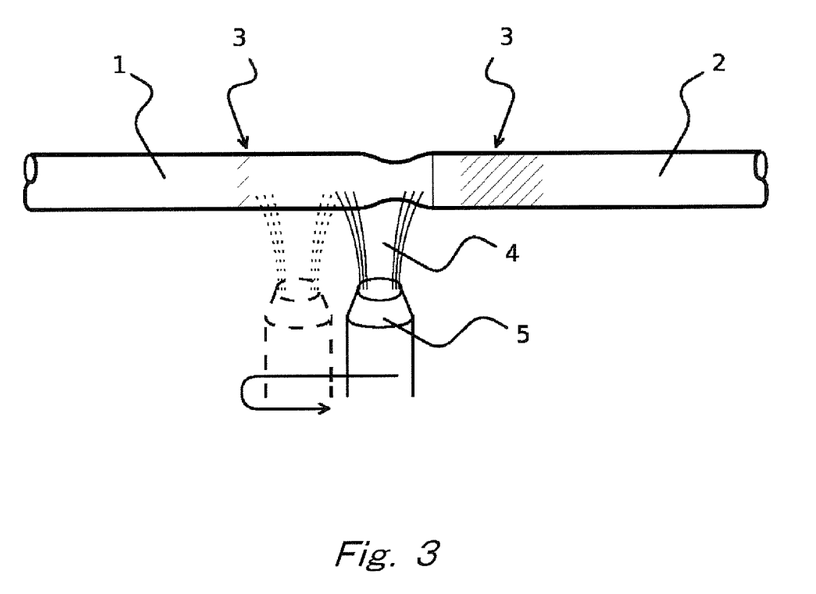
FIG. 3 is a schematic view of still another procedure of the drawing according to one embodiment.

FIG. 3 is a schematic view of another stage of the drawing method of the optical fiber base material 1. As shown in the figures, the burner 5 used in the primary diameter reduction is moved from the initial machining position to the optical fiber base material 1 side, i.e. an opposite side of the dummy rod 2, in the longitudinal direction of the optical fiber base material 1. As a result, on the surface of the optical fiber base material 1, the region continuing to the machining position where the primary diameter reduction is performed is flame polished by the burner flame 4 that the burner 5 injects, and an unevenness of the surface of the optical fiber base material 1 caused by the silica cloud 3 is removed.

The position where the silica cloud is generated differs by the outer diameter of the optical fiber base material. The greater the outer diameter, the greater the distance from the machining position. Therefore, the movement distance of the burner 5 used for the flame polishing, i.e. the distance where the flame polishing is performed, is preferably no less than ½ and no greater than 2 times the outer diameter of the optical fiber base material 1 before the machining, and is more preferably no less than one time and no greater than 1.5 times the outer diameter of the optical fiber base material 1 before the machining.

If the range of flame polishing is narrower than the range described above, the region where the silica cloud 3 still adheres but the flame polishing is not performed remains, and the removal of the silica cloud 3 will be insufficient. On the other hand, if the region of flame polishing is greater than the ranged described above, the region of flame polishing is greater than necessary and the energy efficiency in the optical fiber manufacturing is decreased. Therefore, by flame polishing the optical fiber base material 1 at the range described above, the silica cloud 3 that adhered to the optical fiber base material 1 in the stage that the primary diameter reduction is completed can be removed sufficiently and efficiently.

Also, on the movement of the burner 5 when performing the flame polishing described above, the movement speed of the burner 5 while returning from an end of the region of the flame polishing toward the initial machining position, i.e. the return travel, is preferably greater than the movement speed of the burner 5 while moving away from the machining position used in the primary diameter reduction, i.e. the forward travel. It is because during the forward travel of the burner 5, the burner flame 4 heats a not-yet-heated region of the optical fiber base material 1, resulting in cases where the thermal warping occurs on the optical fiber base material 1 due to the heat distribution if heating the optical fiber base material 1 locally and rapidly.

On the other hand, during the return travel of the burner 5, since the region of the flame polishing has been heated, the thermal warping is difficult to occur within the optical fiber base material 1 even though the burner 5 is moved at a higher speed. Therefore, by increasing the movement speed of the burner 5, the time of the flame polishing can be shortened to improve the energy efficiency, as well as the optical fiber productivity.

Figure 4:
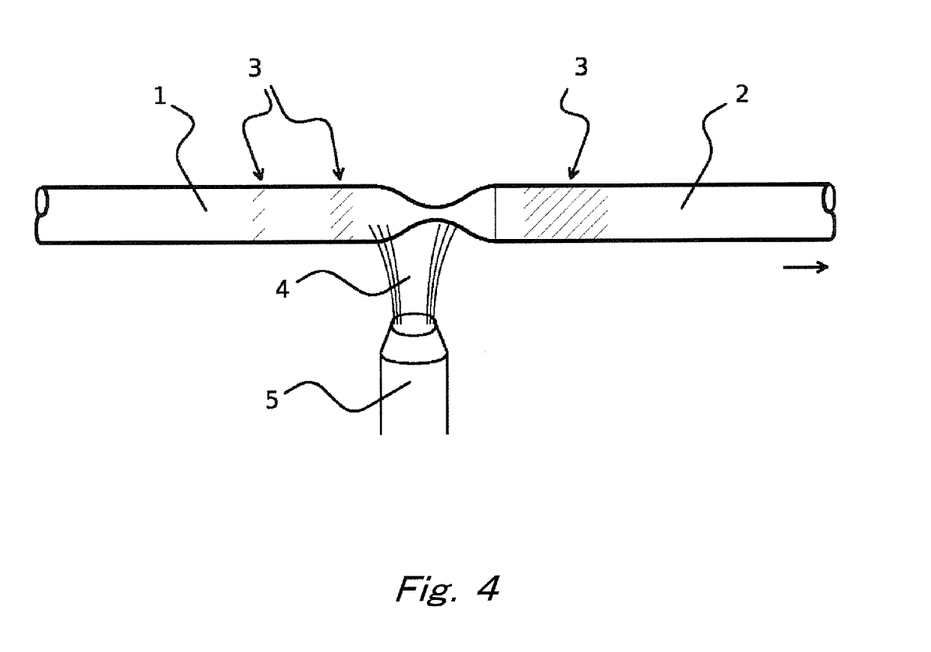
FIG. 4 is a schematic view of yet another procedure of the drawing according to one embodiment.

FIG. 4 is a schematic view of the next stage of the drawing method of the optical fiber base material 1. As shown in the figures, the burner 5 is moved back to the machining position again, and the optical fiber base material 1 where the primary diameter reduction and the flame polishing are completed is heated once again by the burner flame 4. As a result, the heated optical fiber base material 1 is softened again at the machining position.

Furthermore, by increasing the space of the chuck gripping the optical fiber base material 1, as shown in the figures, the optical fiber base material 1 with a part being softened is elongated in the softened region, and the outer diameter is further reduced. As a result, at the machining position of the optical fiber base material 1, the portion where the diameter is reduced to the final target outer diameter is formed. In this way, the reducing the diameter of the optical fiber base material 1 to the final target outer diameter is here referred to as a secondary diameter reduction.

For the target outer diameter in the stage described above, the minimum diameter of the optical fiber base material 1 near the machining position is preferably no greater than 3/10 and no less than 1/10 of the outer diameter before the machining. Also, if the outer diameter of the optical fiber base material 1 after the secondary diameter reduction is greater than 3/10 of the outer diameter before machining, the fire power needed for severing the optical fiber base material 1 is increased, and there are cases where the thermal warping, breaking and the like occur at ends of the optical fiber base material 1. Also, if the outer diameter of the optical fiber base material 1 after the secondary diameter reduction is less than 1/10 of the outer diameter before the machining, the optical fiber base material 1 is too soft and when rotating by the glass lathe, the optical fiber base material 1 is whirled, and there are cases where the breaking of the optical fiber base material 1 also occurs.

Further, as shown in FIG. 4, the burner 5 that has flame polished the optical fiber base material 1 by reciprocation movement relatively along the longitudinal direction of the optical fiber base material 1 is preferably moved back to the initial position, i.e. the start position where the preheating is started, when the flame polishing is completed. As a result, the transition from the flame polishing to the secondary diameter reduction can be performed continuously, and the time required for machining the optical fiber base material 1 can be shortened.

Figure 5:
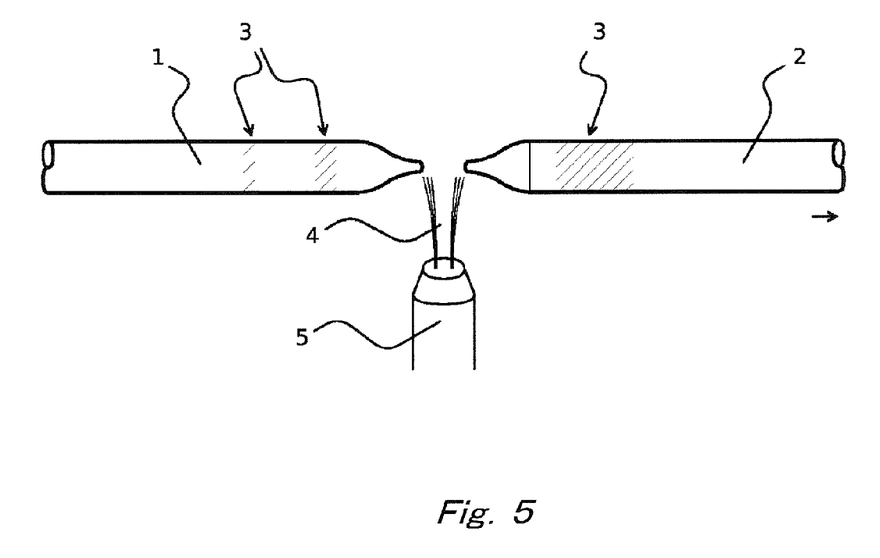
FIG. 5 is a schematic view of still yet another procedure of the drawing according to one embodiment.

FIG. 5 is a schematic view of the next stage of the drawing method of the optical fiber base material 1. In this stage, as shown, by further heating and thermally cutting the minimum diameter portion formed near the machining position, the optical fiber base material 1 where the secondary diameter reduction is completed is severed from the dummy rod 2.

During the heating in the stage described above, the silica cloud 3 is also generated. However, since the optical fiber base material 1 after the primary diameter reduction and the secondary diameter reduction can be thermally cut by a few heating amount, there is few silica cloud 3 generated in the stage described above. Accordingly, since the amount of the silica cloud 3 adhering to the optical fiber base material 1 without flame polishing after the secondary diameter reduction is very small, the effect on the optical fiber quality is small even though drawing the optical fiber is drawn as it is.

Also, if the adhesion amount of the silica cloud 3 on the optical fiber base material 1 becomes excessive, it becomes difficult to remove the silica cloud 3 completely even though the flame polishing is performed in the finishing stage of the optical fiber base material 1. Once the silica cloud 3 is deposited on the surface of the optical fiber base material 1, the unevenness caused by the silica cloud 3 is generated on the surface of the optical fiber base material 1, and it will cause the breaking and the changes of the characteristics when drawing the optical fiber. Also, as a large amount of the silica cloud 3 is deposited, it is required to perform the flame polishing for a long period of time for removal. The time taken until starting the drawing of the optical fiber is significantly long, and the optical fiber productivity is decreased.

Figure 6:
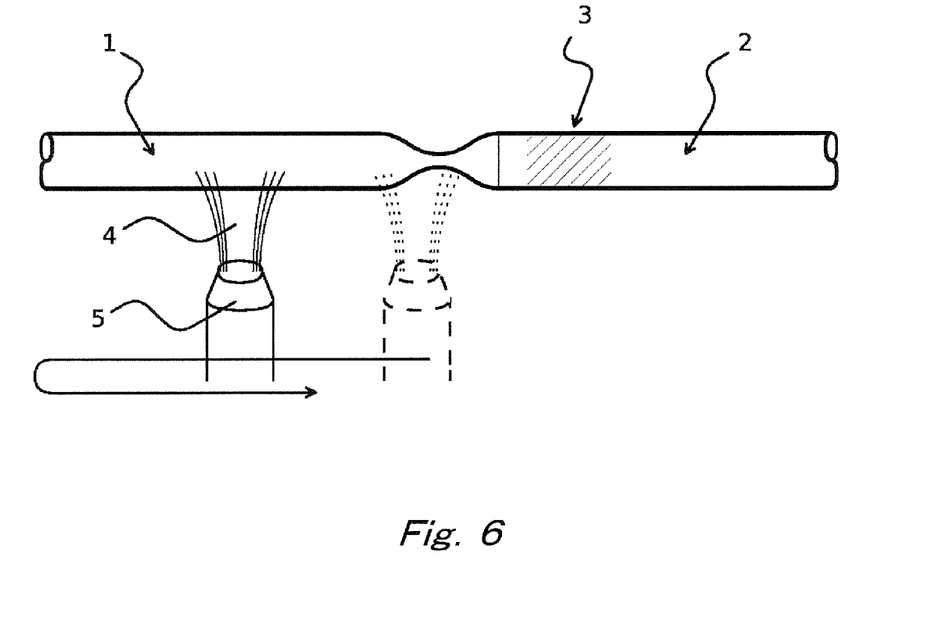
FIG. 6 is a schematic view of yet another procedure of the drawing according to one embodiment.

FIG. 6 is a schematic view of a different stage from the stage shown in FIG. 5, following the stage shown in FIG. 4. As shown, in this example, the surface of the optical fiber base material 1 in which the secondary diameter reduction is completed is flame polished by moving the burner 5 along the optical fiber base material 1.

Figure 7:
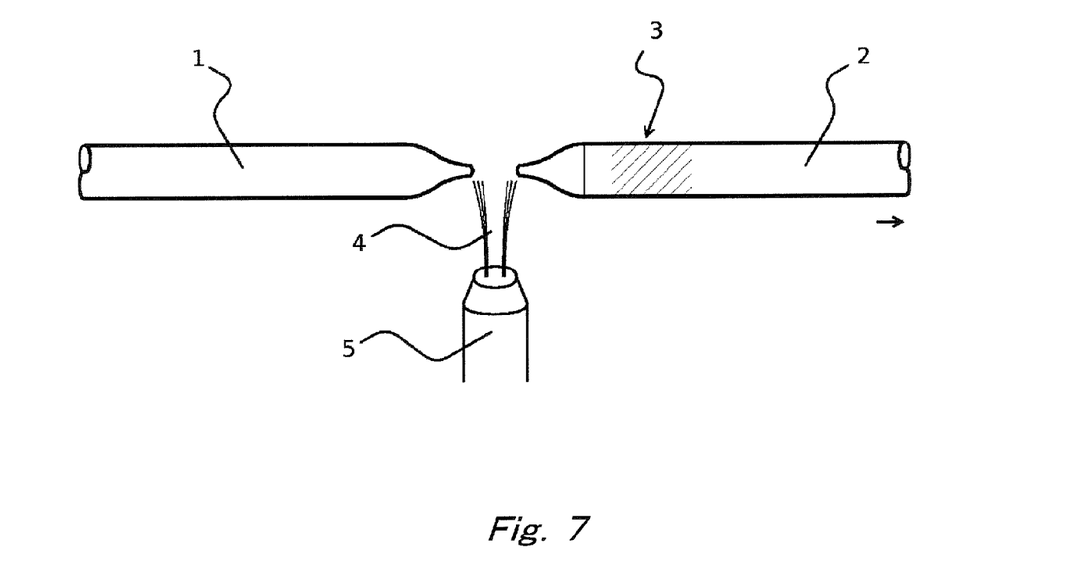
FIG. 7 is a schematic view of still another procedure of the drawing according to one embodiment.

FIG. 7 is a schematic view of the next stage of the drawing method of the optical fiber base material 1. In this stage, as shown, by further heating and thermally cutting the minimum diameter portion formed near the machining position for the optical fiber base material 1 in which the secondary diameter reduction is completed, the dummy rod 2 is severed from the optical fiber base material 1. The unevenness caused by the silica cloud 3 on the surface of the optical fiber base material 1 manufactured in this way is approximately totally removed by the flame polishing, so that an optical fiber with high quality can be drawn.

Also, a method of drawing the optical fiber without removing the silica cloud and the thermal warping after the spindle shape is formed by omitting the flame polishing process has also been attempted. However, even in a case where the optical fiber is drawn with such a method, the disconnection and the like at the adhesion position of the silica cloud 3 and the impurities are still easy to occur. Therefore, the adhesion amount of the silica cloud 3 on the optical fiber base material 1 is preferably smaller.

First Manufacturing Example

Spindle-shaped portions were formed in a plurality of the optical fiber base materials 1 by using a glass lathe that horizontally grips the optical fiber base materials 1 with a hydrogen flame burner, having an oxygen nozzle that discharges oxygen gas as a combustion-assisting gas, as a heating source. The average outer diameter of the optical fiber base materials 1 set horizontally on the glass lathe was $\phi$ 85 mm.

First, as the preheating, the burner 5 injected and blew the burner flame 4 from the connection portion between the optical fiber base material 1 and the dummy rod 2 toward the start position which was separated by 20 mm from the optical fiber base material 1 side. Accordingly, this position of the optical fiber base material 1 was heated and softened.

While the heated portion of the optical fiber base material 1 was in a softened state, the softened portion of the optical fiber base material 1 was elongated by increasing the space of the chuck gripping the optical fiber base material 1 and the dummy rod 2. The operation of the chuck was stopped when the minimum diameter of the diameter-reduced portion of the optical fiber base material 1 became 50 mm, and the reducing of the diameter was stopped and the primary diameter reduction was completed.

Next, the burner 5 was moved along the longitudinal direction of the optical fiber base material 1 at the movement speed of 30 mm/min while injecting the burner flame 4, and the surface of the optical fiber base material 1 was flame polished. When the movement amount of the burner 5 reached 150 mm, the movement direction of the burner 5 was reversed and the burner 5 was moved back to the initial position which was not only the start position of the preheating but also the start position of the flame polishing. During the return travel, the burner flame 4 from the burner 5 was still injected and the flame polishing was continued. Also, during the return travel, the movement speed of the burner 5 was 60 mm/min that is two times as the movement speed during the forward travel.

Stopping the burner 5 at the start position, the space of the chuck was increased while the optical fiber base material 1 is in a softened state, and the secondary diameter reduction was performed until the minimum outer diameter of the optical fiber base material 1 became 20 mm. Further, the series of the procedures under the same condition as described above were performed at the other end of the optical fiber base material 1, and the spindle-shaped portions were formed. The optical fiber base material 1 was thermally cut at the spindle-shaped minimum diameter portion formed in this way and was removed from the glass lathe, and then the drawing of the optical fiber base material 1 to form the spindle-shaped portions at both ends was completed.

After performing the drawing according to the procedures described above on 100 optical fiber base materials 1, an investigation of each of the finished surfaces of the optical fiber base materials 1 was performed. As a result, an unevenness that is assumed to be caused by the silica cloud was found on the surface near the ends of 2 optical fiber base materials 1 of the 100 optical fiber base materials 1. Accordingly, the rate of unevenness on the spindle-shaped portions with the drawing according to the procedures described above was 2%.

Second Manufacturing Example

The drawing to form the spindle-shaped portions was performed on the other 100 optical fiber base materials 1 using the same glass lathe as the first manufacturing example. Here, the average outer diameter of the optical fiber base materials 1 drawn was φ 120 mm.

First, as the preheating, the burner 5 injected and blew the burner flame 4 from the connection portion between the optical fiber base material 1 and the dummy rod 2 toward the start position that is separated by 30 mm from the optical fiber base material 1 side. In this way, this position of the optical fiber base material 1 was heated and softened.

While the heated portion of the optical fiber base material 1 was in a softened state, the space of the chuck gripping the optical fiber base material 1 and the dummy rod 2 was increased, and the softened portion of the optical fiber base material 1 was elongated. The operation of the chuck was stopped when the minimum diameter of the diameter-reduced portion of the optical fiber base material 1 became to 70 mm, the reducing of the diameter was stopped, and the primary diameter reduction was completed.

Next, the burner 5 was moved along the longitudinal direction of the optical fiber base material 1 at the movement speed of 30 mm/min while injecting the burner flame 4, and the surface of the optical fiber base material 1 was flame polished. When the movement amount of the burner 5 reached 200 mm, the movement direction of the burner 5 was reversed and the burner 5 was moved back to the initial position. The initial position was not only the start position of the preheating but also the start position of the flame polishing. Even during the return travel, the burner flame 4 was still injected from the burner 5 and the flame polishing continued. Also, during the return travel, the movement speed of the burner 5 was 60 mm/min which was two times as the movement speed of the forward travel.

Stopping the burner 5 at the start position, the space of the chuck was increased with the optical fiber base material 1 in a softened state, and the secondary diameter reduction was performed until the minimum outer diameter of the optical fiber base material 1 became 25 mm. Further, the series of the procedures under the same condition as described above at the other end of the optical fiber base material 1 were performed, and the spindle-shaped portions were formed. The optical fiber base material 1 was thermally cut at the spindle-shaped minimum diameter portion formed in this way and was removed from the glass lathe, and then the drawing of the optical fiber base material 1 to form the spindle-shaped portions at both ends was completed.

After performing the drawing according to the procedure described above on 100 optical fiber base materials 1, an investigation of each of the finished surfaces of the optical fiber base materials 1 was performed. As a result, an unevenness that is assumed to be caused by the silica cloud was found on the surface near the ends of 1 optical fiber base material 1 of the 100 optical fiber base materials 1. Accordingly, the rate of the unevenness of the spindle-shaped portions with the drawing according to the procedures described above was 1%.

Comparative Example

Figure 8:
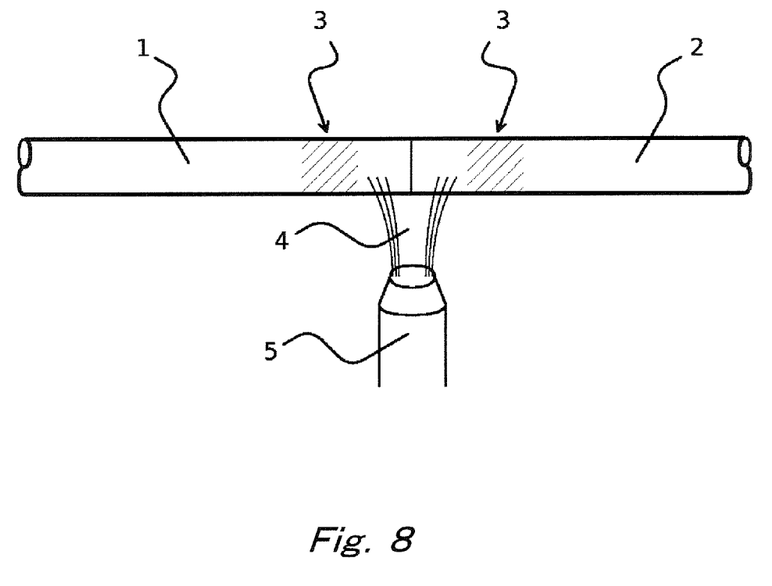
FIG. 8 is a schematic view of one procedure of a drawing according to a comparative example.

FIGS. 8 to 13 are schematic views of another optical fiber base material drawing method according to the comparative examples, shown in multiple stages. Comparative manufacturing examples described below were manufactured by this method. Further, in FIG. 8, the components that are the same as the components of FIGS. 1 to 7 are given the same reference numerals, and redundant descriptions are omitted. Also, in FIGS. 9 to 13, the components that are the same as shown in FIG. 8 are given the same reference numerals, and the redundant descriptions are omitted.

As shown in FIG. 8, the optical fiber base material 1 is gripped horizontally by a glass lathe in a state being connected with the dummy rod 2 at one end. A machining position near the end of such the optical fiber base material 1 is set, and the burner 5 as the heating source blows the burner flame 4 toward a side face of the optical fiber base material 1 at the machining position. Accordingly, the preheated optical fiber base material 1 becomes softened at the machining position. Also, the silica cloud 3 generated by the preheating adheres to the surface of the optical fiber base material 1 near the connection portion.

Figure 9:
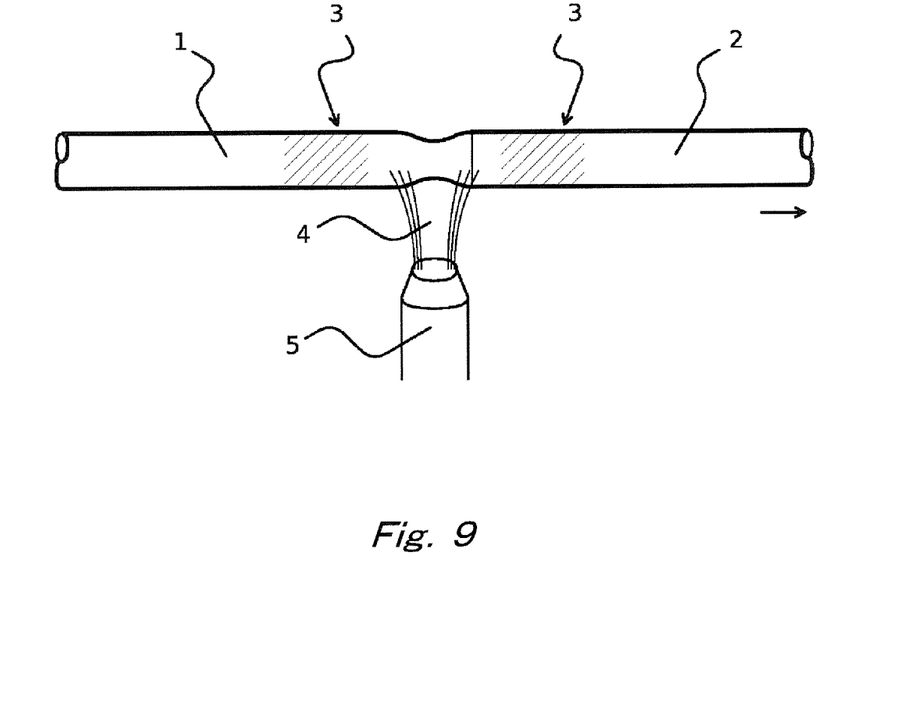
FIG. 9 is a schematic view of another procedure of the drawing according to the comparative example.

FIG. 9 is a schematic view of the next stage of the drawing method according to the comparative example. As shown in the figures, by increasing the space of the chuck gripping the optical fiber base material 1 at the glass lathe, the outer diameter of the optical fiber base material 1 with a part being softened begins to constrict resulting from the elongation in the softened region.

Figure 10:
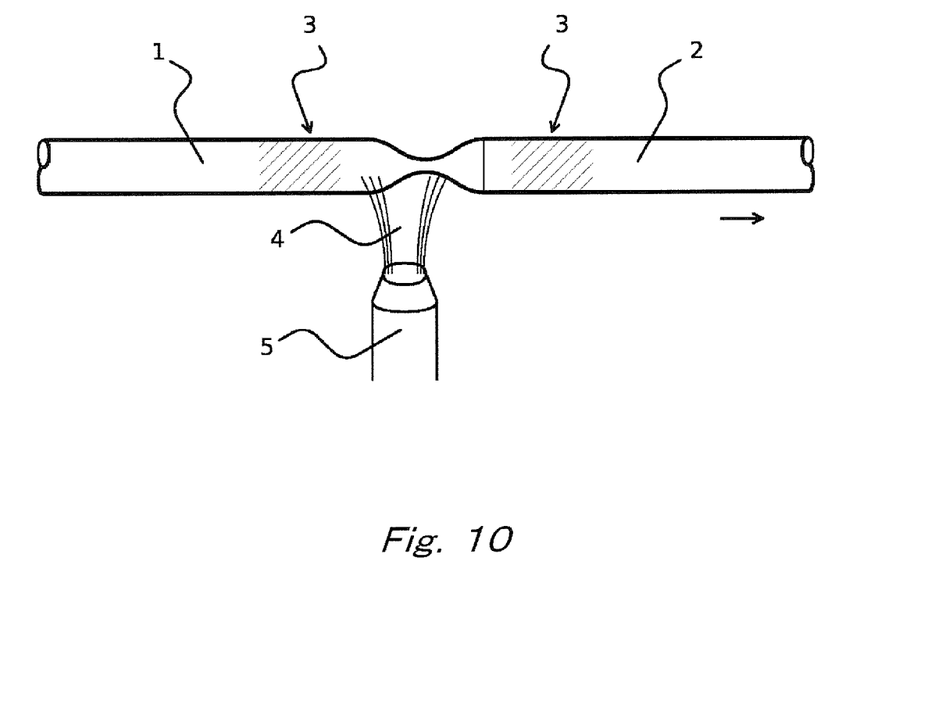
FIG. 10 is a schematic view of another procedure of the drawing according to the comparative example.

FIG. 10 is a schematic view of the following stage of the drawing method according to the comparative example. As shown, the spindle shapes are formed at the softened portion of the optical fiber base material 1 by adjusting appropriately the amount of the combustible gas, such as the hydrogen that the burner 5 supplies as the heating source, and that of the combustion-assisting gas such as oxygen and the like, and the speed to increase the space of the chuck of the glass lathe.

Even during the formation of these spindle shapes, the injection of the burner flame 4 from the burner 5 continues. As a result, more silica clouds 3 are deposited near the region where the spindle shapes are formed on the optical fiber base material 1 with the injection of the burner flame 4 for the preheating.

Figure 11:
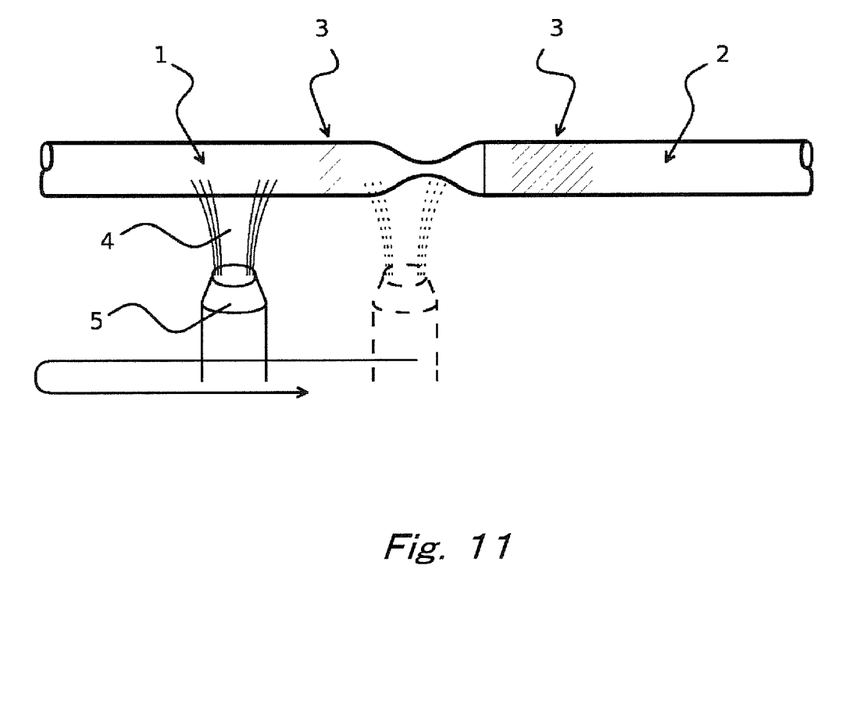
FIG. 11 is a schematic view of another procedure of the drawing according to the comparative example.

FIG. 11 is a schematic view of the following stage of the drawing method according to the comparative example. As shown, the optical fiber base material 1 is flame polished for removal of the deposited silica cloud 3. Also, the flame polishing is also for reducing the thermal warping generated on the optical fiber base material 1 by the heating. The flame polishing is performed by injecting the burner flame 4 from the burner 5 toward the surface of the optical fiber base material 1 at least in the region following the region where the spindle shapes are formed.

Figure 12:
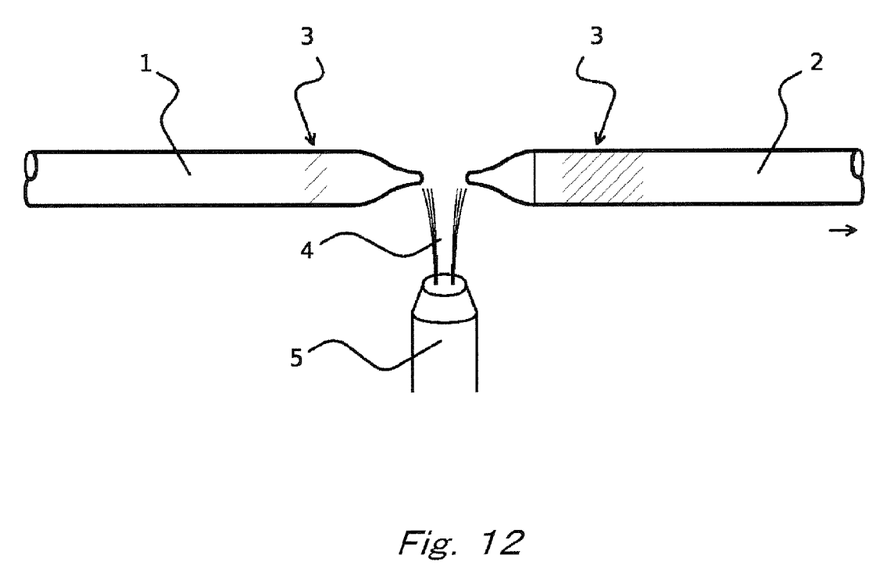
FIG. 12 is a schematic view of another procedure of the drawing according to the comparative example.

FIG. 12 is a schematic view of the following stage of the drawing method according to the comparative example. As shown in the figures, the thin diameter portion of the optical fiber base material 1 was heated locally by the small burner flame 4, and then the optical fiber base material is thermally cut. As a result, while the dummy rod 2 is severed from the optical fiber base material 1, the positions of the spindle-shaped portions on the optical fiber base material 1 become ends of the optical fiber base material 1.

Figure 13:
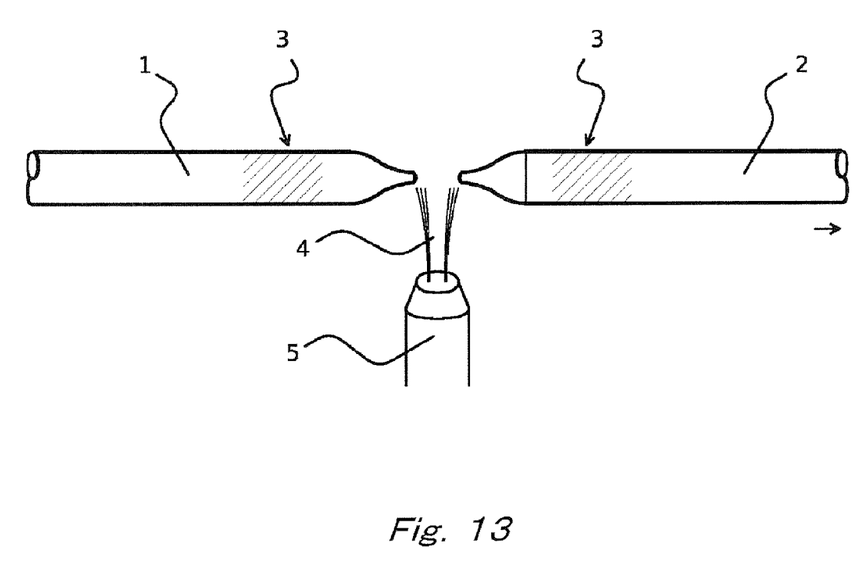
FIG. 13 is a schematic view of another procedure of the drawing according to the comparative example.

Furthermore, omitting the flame polishing shown in FIG. 11, after the spindle shapes are formed at the ends of the optical fiber base material 1, as shown in FIG. 13, the optical fiber base material 1 also can be thermally cut as it is severing the dummy rod 2. However, in that case, as also shown in the drawing, the large amount of the deposited silica cloud 3 remains on the surface of the optical fiber base material 1. Also, the thermal warping remains in the region heated during the formation of the spindle shapes.

First Comparative Manufacturing Example

Using a glass lathe with the same specification as the first manufacturing example, similar to the first manufacturing example, the drawing to form the spindle-shaped portions at both ends of the optical fiber base material 1 with the average outer diameter of ϕ 85 mm was performed. However, the diameter of the optical fiber base material 1 had kept been reduced without interruption from the initial outer diameter ϕ 85 mm to the outer diameter ϕ 20 mm before thermally cut, and the spindle shapes were formed. Accordingly, the surface of the optical fiber base material 1 was not flame polished during the diameter reduction but was flame polished right before the thermal cut, and the thermal warping of the optical fiber base material 1 is removed together with the removal of the silica cloud 3 on the surface of the optical fiber base material 1.

As investigating the surfaces near the ends of the optical fiber base materials 1 of the 100 optical fiber base materials 1 drawn according to the procedures described above, the unevenness assumed to be caused by the silica cloud was found in 10 of the optical fiber base materials 1. Therefore, according to this method, the rate of the unevenness with the drawing of the optical fiber base material 1 was 10%.

Second Comparative Manufacturing Example

Other 100 optical fiber base materials 1 were further drawn according to the same procedures as the first comparative manufacturing example. The machining was performed. As investigating the surfaces near the ends of the optical fiber base materials 1 having the obtained spindle-shaped portions, the unevenness assumed to be caused by the silica cloud 3 was found on the surfaces of 9 of the optical fiber base materials 1. Accordingly, the rate of the unevenness was 9%.

As described above, according to the machining method of the embodiments, when the spindle-shaped portions are formed at the ends of the optical fiber base material 1, the unevenness of the surface and the adhesion of the impurities can be restrained. Accordingly, when drawing an optical fiber from the optical fiber base material, the breaking of the optical fiber, the changes of the characteristics and the like can be restrained, and a high-quality optical fiber manufacturing can be obtained with high yield.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An optical fiber base material machining method comprising:
a first diameter reduction stage of reducing, at a machining position, an initial outer diameter of an optical fiber base material to an intermediate outer diameter that is no less than ½ of the initial outer diameter of the optical fiber base material before the first diameter reduction stage;
a first flame polishing stage of flame polishing to reduce a first silica cloud of a surface of the optical fiber base material in a first region including the machining position;
a second diameter reduction stage, after the first flame polishing stage, of further reducing the outer diameter of the optical fiber base material until the outer diameter reaches a final target outer diameter in a range where the outer diameter is no greater than 3/10 and no less than 1/10 of the initial outer diameter before the first diameter reduction stage;
a second flame polishing stage, after the second diameter reduction stage, of flame polishing to reduce a second silica cloud formed on the surface of the optical fiber base material after the first flame polishing stage; and
a severing stage, after the second flame polishing stage, of severing the optical fiber base material at the machining position to form spindle-shaped portions at severed ends of the optical fiber base material, wherein each of the first and second flame polishing stages includes a burner flame that is moved reciprocally from the machining position along a length of the optical fiber base material, a first speed of travel of the burner flame as it moves away from the machining position being slower than a second speed of travel of the burner flame as it moves toward the machining position.

2. The optical fiber base material machining method according to claim 1, wherein
the outer diameter of the optical fiber base material is reduced by increasing tension on the machining position which is in a heated and softened state.

3. The optical fiber base material machining method according to claim 2, wherein
the optical fiber base material is heated by a burner flame that a burner ejects and blows toward the optical fiber base material.

4. The optical fiber base material machining method according to claim 3, wherein
the burner is moved reciprocally from and to the machining position along the optical fiber base material while the tension is maintained constant on the machining position, to thereby flame polish the surface of the optical fiber base material.

5. The optical fiber base material machining method according to claim 4, wherein
the burner is moved reciprocally from and to the machining position within a range which is no less than ½ and no greater than two times the initial outer diameter of the optical fiber base material before the first diameter reduction stage.

6. The optical fiber base material machining method according to claim 1, wherein
the optical fiber base material is severed by heating and thermally cutting a portion where the final target outer diameter of the optical fiber base material is at a minimum.

7. The optical fiber base material machining method according to claim 1, wherein at least one of reducing the outer diameter, flame polishing and severing is performed by using a glass lathe.

8. The optical fiber base material machining method according to claim 1, wherein
the second flame polishing stage flame polishes a second region of the surface of the optical fiber base material, the second region having a larger area than the first region that is flame polished at the first flame polishing stage.

* * * * *